United States Patent Office 3,533,846
Patented Oct. 13, 1970

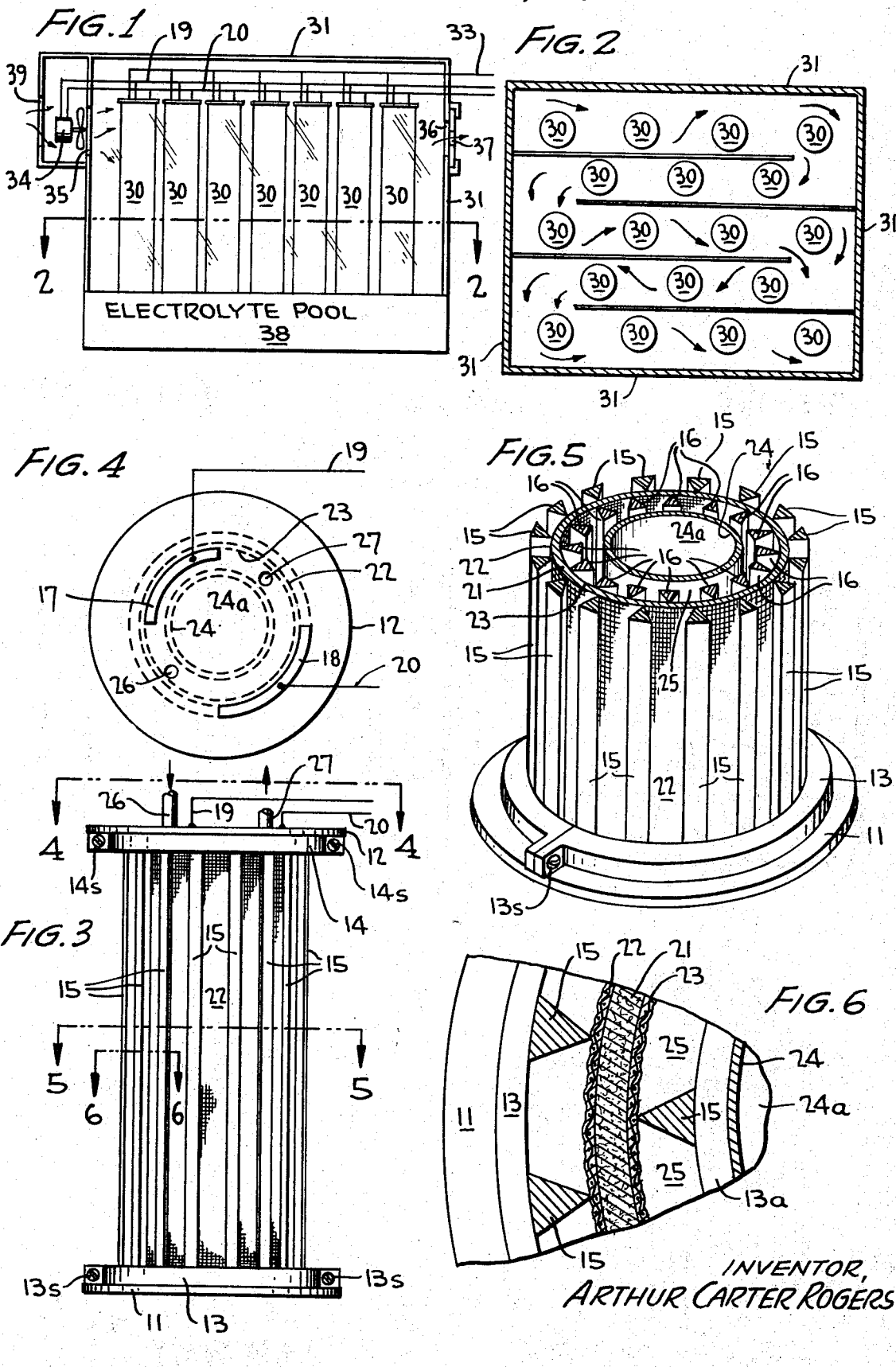

3,533,846
FUEL CELL STRUCTURE
Arthur Carter Rogers, Bloomfield, Conn., assignor, by mesne assignments, to Leesona Corporation, Warwick, R.I., a corporation of Massachusetts
Filed June 29, 1966, Ser. No. 561,514
Int. Cl. H01m 27/02, 27/22
U.S. Cl. 136—86                                           7 Claims

ABSTRACT OF THE DISCLOSURE

A battery of fuel cell is described, each cell comprising a sleeve-like cathode concentrically mounted and superimposed upon a sleeve-like anode of smaller diameter to define a space of substantially uniform dimensions between adjacent faces of the anode and cathode. An aqueous electrolyte is contained in the space between the electrodes and is in contact with one face of each of the electrodes. Means are provided for supplying fuel to the second face of the anode with the second face of the cathode being exposed to the surroundings of the cell. The cells are substantially uniformly arranged in a box-like compartment containing an electrolyte pool at the bottom thereof with the battery being constructed and arranged in order that the space between adjacent faces of the electrodes is in free communication with the electrolyte pool. Oxidant is supplied to the cathode by means of a fan.

---

This invention relates to a novel structure for a fuel cell assembly and to the novel construction of the individual fuel cell modules to be used in such an assembly.

Fuel cells are electrochemical devices for the direct production of electricity from a fuel and an oxidant. Such devices are used to convert chemical energy directly to electrical energy, without the need for an intermediary conversion of the energy into heat and/or mechanical energy.

Electrical energy is produced in these devices by a free energy-producing chemical reaction occurring at the triple interface between the reactant, the electrolyte and the catalyst. Such an interface is maintained at each of the electrodes of the cell, the reactant at the cathode being an oxidant and the reactant at the anode being a fuel.

Practical considerations generally make it desirable to limit the size of a pair of electrodes of a fuel cell. Therefore, in order to generate quantities of electrical energy greater than those which can be produced by a single pair of electrodes of practical or desirable size, it is necessary to interconnect a plurality of such pairs of electrodes, or individual fuel cells, in parallel. Simarly, inasmuch as each fuel cell system, (i.e., each combination of anode, cathode and electrolyte) will produce electrical energy at a given characteristic voltage, and inasmuch as these voltages are generally considerably lower than voltages required for many of the devices to be energized by the fuel cell, a plurality of such fuel cells are frequently interconnected in series in order to produce electrical energy at the desired voltage.

A plurality of individual fuel cells are frequently assembled for interconnection and joint operation in the form of stacks wherein there are alternate layers of pairs of electrodes, each pair being separated by an electrolyte space, and spaces for supplying reactant to the electrodes. In this kind of an arrangement the electrodes of alternate fuel cells are generally "reversed" so that the anodes from two adjacent fuel cells will each face a common space through which fuel can be supplied to both, and similarly with the cathodes from two other adjacent fuel cells.

One disadvantage of such an arrangement is that it is difficult to replace individual fuel cells, should the need arise, from such a stack. Also, a certain degree of inefficiency is inherent in the stack-type arrangement inasmuch as the anodes and cathodes must necessarily be of equal size, even though the anode may be more highly reactive per unit of surface. Furthermore, the condition of the electrodes cannot be visually observed during operation in such a stack arrangement, reducing the chances of observing incipient failure as by the development of dry spots in the electrolyte supply mechanism or the electrode.

Another disadvantage of currently available fuel cell devices is their relatively high requirement for "parasite power," i.e., for the power required to operate the equipment necessary for the functioning of the fuel cell itself, such as apparatus to circulate the fluids consumed by the fuel cell, control apparatus and the like.

It is an object of this invention to provide a fuel cell assembly in which the individual cells are in the form of modules which are readily replaced in the assembly.

Another object of this invention is to provide a fuel cell assembly in which the individual cell modules may be visually observed during operation.

Still another object of this invention is to provide a fuel cell asembly which operates on a minimum of "parasite power," and is relatively simple and inexpensive to operate and control.

Yet another object of this invention is to provide a fuel cell module in which the effect of development of dry spots on the matrix may be visually observed.

The manner in which these and other objectives of the instant invention are accomplished will become more readily apparent from a consideration of this specification, especially when taken in conjunction with the accompanying drawing, in which:

FIG. 1 is a schematic elevation of one embodiment of the fuel cell assembly of the instant invention;

FIG. 2 is a schematic plan view of the same assembly, viewed on plane 2—2 indicated on FIG. 1;

FIG. 3 is an elevation of an embodiment of a single fuel cell module to be employed in the instant invention;

FIG. 4 is a plan view of the same module, viewed on plane 4—4 indicated on FIG. 3;

FIG. 5 is a sectional, isometric representation of the portion of the same module existing below plane 5—5 on FIG. 3; and FIG. 6 is an enlarged cross-sectional plan view of a portion of the same module as viewed on plane 6—6 on FIG. 3.

Referring first to FIG. 3, it is seen that the fuel cell module is confined between lower insulation and holder plate 11 and upper insulation and holder plate 12. Lower clamp ring 13 and upper clamp ring 14, which may be secured by screws 13s and 14s respectively, hold a plurality of cathode rods 15. These cathode rods, which may be fashioned from any electrical conductor which has corrosion resistant properties suitable for this service into any convenient shape (such as that of triangular cross-section indicated in the drawing), together with a plurality of similary fashioned anode rods 16 (FIG. 5) held in place by lower clamp ring 13a (FIG. 6) and upper clamp ring (not shown) serve a dual function. Firstly, they hold the electrode assembly in place and the functional elements thereof in working relationship with each other. Secondly, each plurality of rods serves to provide an electrically conductive path between the respective electrodes which it contacts and its corresponding electrode plate (FIG. 4), i.e, anode plate 17 and cathode plate 18. Attached to the anode and cathode plates, respectively, are anode lead 19 and cathode lead 20.

The electrodes are sleeve-like, mounted concentrically so as to be superimposed one over the other and so that their adjacent surfaces define between them an annular space of substantially uniform thickness. In the embodiment shown the electrodes are each cylindrical screen type electrodes and the space between them is a cylindrical annulus filled with a matrix 21 which, in operation, serves to circulate the electrolyte to the electrodes by "wicking."

The cathode 22 is the outside electrode, and the anode 23 is inside of it in the embodiment shown. As will be apparent, the electrode having the greatest reactivity can be placed on the inside and the electrode having the lower reactivity can be placed on the outside. Since the electrode having the lower reactivity will have a greater surface area as a result of the electrode configuration, a more evenly balanced cell is obtained. Where hydrogen is used as the fuel and air is used as the oxidant, the anode will usually be more reactive.

Cell module well barrier 24, together with the gas (inside) face of anode 23, define an annular fuel supply passage 25. Fuel is circulated through this passage by means of fuel inlet 26 (FIGS. 3 and 4) and fuel vent 27.

Air circulating about the outside of the fuel cell module supplies the requisite oxygen to the cathode 22 of the cell. By virtue of the shape of the cathode and anode rods in the embodiment depicted in FIGS. 4, 5 and 6, their presence does not interfere with the circulation of the reactant to any portion of the electrodes, inasmuch as these triangularly cross-sectionally shaped rods make a virtual line contact with the respective electrodes which they touch.

In the embodiment shown in FIG. 6 the space between the electrodes is occupied by a wicking matrix 21. Any material which will resist corrosion by the electrolyte and will permit movement therethrough by the electrolyte by means of capillary action, is suitable for this purpose. Fibrous materials such as asbestos and fiberglass are suitable for this purpose.

In other embodiments, the matrix is omitted, the electrolyte being freely circulated in the space between the electrodes by any convenient means, as by gravity, pumping, etc.

In other embodiments of the invention other types of electrodes are employed. These types include bi-porous electrodes such as the lithiated nickel oxide structures described by Bacon in U.S. Pat. No. 2,716,670 or the non-porous hydrogen diffusion membrane type electrodes such as the palladium/silver non-porous electrodes described by Oswin in U.S. Pat. No. 3,092,517. Substantially any of the prior electrolytes are operable in the present invention.

The manner of assembling the individual fuel cell modules in accordance with this invention will best be understood by a consideration of FIGS. 1 and 2. The modules 30 are placed in a box-like enclosure 31 in such fashion as to permit free circulation of gaseous oxidant about each of them. To this end, flow dividers 32 which direct the flow of the oxidant to circulate around all of the modules at a uniform rate, such as are shown in FIG. 2, may be provided. The modules may be clamped, by means not shown, in the enclosure to assure their stability and relative spacing. The anode leads 19 and cathode leads 20 of the cell modules are interconnected in the desired fashion for connection with the electrical load. Fuel piping 33 is connected to the fuel supply entry ports 26 and fuel vents 27 of the various modules.

Means for forcing gaseous oxidant, such as air, and for circulating it to the cathodes of the various fuel cell modules are also provided. In the embodiment shown, such means are provided in the form of electrically actuated fan 34 which draws air into the box-like enclosure through ventilating port 35, whence the air circulates about all of the fuel cell modules 30 by virtue of the location of circulation guides 32 and thence out of the box-like enclosure through port 36. The quantity of air being circulated to the fuel cell modules may be controlled by controlling the size of the aperture 37 in exit port 36 by any known means. The fan 34 is energized by electricity generated by the fuel cell assembly. Instead of a fan, gaseous oxidant may be furnished by other means, as from a compressed storage source, the flow being regulated by a solenoid valve.

At the bottom of the box-like enclosure 31, an electrolyte pool 38 may conveniently be located. In the event that a caustic electrolyte is employed, it is necessary to scrub the air before it is introduced to the box-like enclosure by any convenient means, such as the employment of a scrubber shown schematically at 39. Failure to do so will result in the formation of insoluble carbonates by the reaction between carbon dioxide in the air and the caustic electrolyte. In the event that an acid electrolyte is used, no such scrubbing device is necessary.

Alternative to the use of an electrolyte pool 38, as shown in FIG. 1, the electrolyte for each module may be maintained separately in the central well 24a (FIGS. 4 and 5) of each module and supplied to the space between the electrodes of that module by any convenient means such as a circulating pump, etc. On the other hand, if the central well 24a of each module is not employed for this purpose, the space may be employed for fuel reforming, purification or the like by any convenient form of equipment.

The instant invention is not limited to the employment of any particular type of electrode. In the embodiment depicted in FIG. 6, screen type electrodes are used. Such electrodes are fashioned from a porous conductive supporting metal such as a fine wire diameter, fine mesh screen made of an electrically conductive and corrosion resistant metal such as nickel, tantalum or zirconium.

This screen or other porous conductive metal structure is impregnated with particles of catalyst and particles of an inert polymeric filler to provide a reactive layer which is pervious to the reactants and yet which provides an electrically conductive path from the catalyst particles to the porous conductive metal support. The catalyst may be any material which will be beneficial to the free energy-producing reaction which is to be conducted in the fuel cell and may be a metal from Group I–B or from Group VIII of Mendelyeev's Periodic Table of the Elements, such as silver, gold, ruthenium, rhodium, palladium, osmium, iridium or platinum. Platinum black and palladium black are especially desirable for this purpose. The inert polymeric filler may conveniently be a fluorocarbon polymer, by which is meant any high molecular weight polymeric compound containing carbon and fluorine. Polytetrafluoroethylene, polytrifluorochloroethylene, polyvinylfluoride, polyvinylidenefluoride, polytrifluoroethylene and co-polymers of the monomers which form these polymers are examples of such compounds.

The fuel to be supplied for reaction in the fuel cell may be hydrogen or a hydrogen-containing compound such as a hydrocarbon. In the event that a hydrogen-containing compound is furnished as the fuel, it can be fed directly or it can conveniently be supplied to reforming equipment located in the well 24a of each fuel cell module, whence the hydrogen formed as a result of said reforming is supplied to the anode in the usual fashion.

The oxidant to be furnished to the cathodes of the respective fuel cell module will most conveniently be air. It is not necessary that the air be of controlled humidity.

The electrolyte employed can be any of the prior art electrolytes including alkali materials such as the alkali metal hydroxides, acid electrolytes such as sulfuric and phosphoric acid, and the like. It is only essential that the electrolyte remain invariant, or substantially invariant, under the operating conditions of the cell. When employing screen-type electrodes, it may be preferred that the electrolyte be trapped in a suitable matrix. Specifically, electrolytes which can be used are a 30 percent aqueous solution of potassium hydroxide, as an example of an alkaline electrolyte, or a 5 N aqueous solution of sulfuric acid, as an example of an acid electrolyte.

Operation of the fuel cell assembly of the instant invention is exceedingly simple. In the embodiment depicted in FIG. 1, operation of the cell is initiated by simply starting fan 34 and by supplying fuel through fuel supply piping 33. The fan will begin the circulation of air around all of the modules, supplying oxygen to the cathodes thereof. Starting the fan 34 also closes the electrical circuit, permitting current flow from the cells. Adjusting the size of the opening 37 will affect the backpressure on fan 34, and thereby control the amount of air being circulated through the box-like enclosure 31. This in turn controls the rate of electrical energy output of the fuel cell assembly. In the embodiment depicted in FIG. 1 the only consumption of parasite power in the operation of the fuel cell occurs in the operation of fan 34. Thus operation can be quite efficient, with the bulk of the electrical energy generated in the cell being available for delivery to an external load.

The box-like enclosure 31 and flow directors 32 may conveniently be made from a transparent material such as Lucite or Plexiglas. When this is done visual inspection of all of the cell modules is possible at all times during operation, especially if the modules are distributed throughout the box-like enclosure in the staggered manner depicted in FIG. 2. By the application of a well known technique involving the use of indicator dyes which change color under the conditions which prevail when the matrix develops dry spots as a result of imperfect operation, the opportunity for visual inspection of the surfaces of the electrodes during operation permits the detection of incipient malfunctions and thus the avoidance of inefficient operation, shut down or breakdown.

The arrangement of the fuel cell assembly of the instant invention also minimizes sealing and leakage problems.

I claim:
1. A fuel cell assembly comprising a plurality of fuel cell modules,
   each of said modules comprising a sleeve-like, substantially cylindrical, cathode concentrically superimposed over a sleeve-like substantially cylindrical anode of smaller diameter and of substantially equal length, whereby said cathode and anode define between their adjacent surfaces an annular space of substantially uniform thickness, said space being occupied by a wicking matrix,
   a first plurality of vertical electrically conductive rods contacting the inside surface of said anode and a second plurality of vertical electrically conductive rods contacting the outside surface of said cathode, said rods being secured to maintain said electrodes in operative relationship to each other, each plurality of rods also being in electrical contact with the terminal plate for the respective electrode which it contacts,
   means for supplying gaseous fuel to the inside surface of said anode,
   said modules being vertically disposed in a box-like enclosure and contacting a pool of electrolyte occupying the bottom of said enclosure,
   said modules being uniformly distributed throughout said box-like enclosure to permit substantially uniform circulation of air about said modules in said enclosure,
   an electrically actuated fan means for forcing quantities of air into said box-like enclosure and around said modules,
   flow director means in said box-like enclosure to create a path therein to direct the circulating air past all of said modules,
   and an opening in said enclosure remote from the said fan means to permit egress of circulated air from said enclosure, and means for controlling the size of said opening.

2. The fuel cell assembly of claim 1 wherein said box-like enclosure and said flow director means are transparent, and wherein said modules are distributed therein in staggered fashion, whereby substantially all of the gas surface of the cathode of each of said modules is subject to visual observation from outside of said enclosure during operation.

3. In a fuel cell module an electrode assembly comprising a sleeve-like substantially cylindrical first electrode concentrically superimposed over a sleeve-like, substantially cylindrical, second electrode of smaller diameter and of substantially equal length, whereby said electrodes define between their adjacent surfaces an annular space of substantially uniform thickness, said space being occupied by a wicking matrix, a first plurality of vertical electrically conductive rods contacting the outside surface of said first electrode and a second plurality of vertical electrically conductive rods contacting the inside surface of said second electrode, said rods being secured to maintain said electrodes in operative relationship to each other, each plurality of said rods also being in electrical contact with the terminal plate for the respective electrode which it contacts.

4. The electrode assembly of claim 3 wherein said first electrode is the cathode and said second electrode is the anode.

5. The fuel cell assembly of claim 3 wherein said rods are of triangular cross section.

6. A fuel cell assembly for operation at moderate and low temperatures comprising a plurality of fuel cell modules, each module comprising a sleeve-like cathode concentrically mounted and superimposed upon a sleeve-like anode of smaller diameter to define a space of substantially uniform dimensions between the adjacent faces of these respective electrodes, an aqueous electrolyte flowable at substantially ambient temperatures filling said space and being in contact with one face of each of said cathode and anode, means for supplying fuel to the second face of said anode, and the second face of said cathode being substantially exposed to the surroundings of said module, said modules being distributed in a box-like enclosure to permit substantially uniform circulation of a gaseous oxidant about them, means for forcing controlled quantities of gaseous oxidant into said box-like enclosure and around said modules, said plurality of fuel cell modules being vertically disposed in a pool of aqueous liquid electrolyte flowable at substantially ambient temperatures occupying the bottom of said box-like enclosure with said space between the adjacent faces of said anode and cathode being in free communication with said electrolyte pool, and means for circulating said electrolyte from said pool into said space between said electrodes of said module.

7. A fuel cell assembly for operation at moderate and low temperatures comprising a plurality of fuel cell modules, each module comprising a sleeve-like first electrode concentrically mounted and superimposed upon a sleeve-like second electrode of opposite polarity and smaller diameter to define a space of substantially uniform dimensions between the adjacent faces of said first and second electrodes, an aqueous electrolyte flowable at substantially ambient temperatures filling said space and in contact with one face of each of said first and second electrodes, means for supplying fuel to the second face of one of said first and second electrodes, the second face of the other of said first and second electrodes being substantially exposed to the surroundings of said module, said modules being distributed in a box-like enclosure to permit substantially uniform circulation of a gaseous oxidant about them, means for forcing controlled quantities of gaseous oxidant into said box-like enclosure and around said modules, said plurality of fuel cell modules being vertically disposed in a pool of aqueous liquid electrolyte flowable at substantially ambient temperatures occupying the bottom of said box-like enclosure with said space between the adjacent faces of said first and second electrodes being in free communication with said electrolyte pool, and means for circulating said electrolyte from said pool into said space between said first and second electrodes of said modules.

References Cited

UNITED STATES PATENTS

| | | | |
|---|---|---|---|
| 3,068,311 | 12/1962 | Chambers et al. | 136—86 |
| 3,180,762 | 4/1965 | Oswin | 136—86 |
| 3,261,716 | 7/1966 | Roblee et al. | 136—86 |
| 3,359,134 | 12/1967 | Salvadori et al. | 136—86 |
| 3,364,071 | 1/1968 | Kordesch | 136—86 |
| 3,403,054 | 9/1968 | Puffer et al. | 136—86 |

FOREIGN PATENTS

| | | |
|---|---|---|
| 233,847 | 9/1959 | Australia. |
| 731,755 | 4/1966 | Canada. |
| 1,331,774 | 5/1963 | France. |
| 1,415,543 | 9/1965 | France. |
| 1,106,228 | 3/1968 | Great Britain. |

ALLEN B. CURTIS, Primary Examiner

U.S. Cl. X.R.

136—120, 162